No. 772,034. PATENTED OCT. 11, 1904.
W. M. FULTON.
TENSION DEVICE FOR SCALES, PRESSURE GAGES, &c.
APPLICATION FILED APR. 17, 1903.
NO MODEL. 2 SHEETS—SHEET 1.

Witnesses
Chas. K. Davis
Gustave R. Thompson

Inventor
Weston M. Fulton,
By Mauro Cameron & Lewis
Attorneys

No. 772,034. PATENTED OCT. 11, 1904.
W. M. FULTON.
TENSION DEVICE FOR SCALES, PRESSURE GAGES, &c.
APPLICATION FILED APR. 17, 1903.
NO MODEL. 2 SHEETS—SHEET 2.
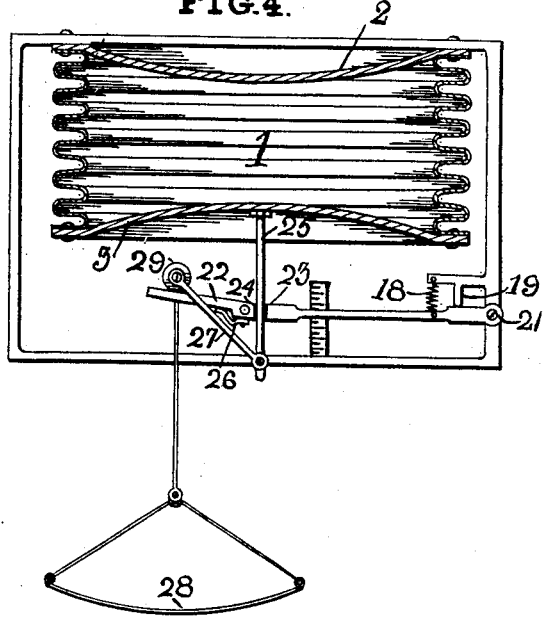
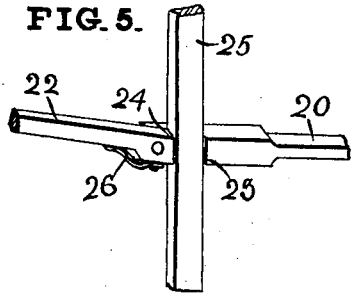
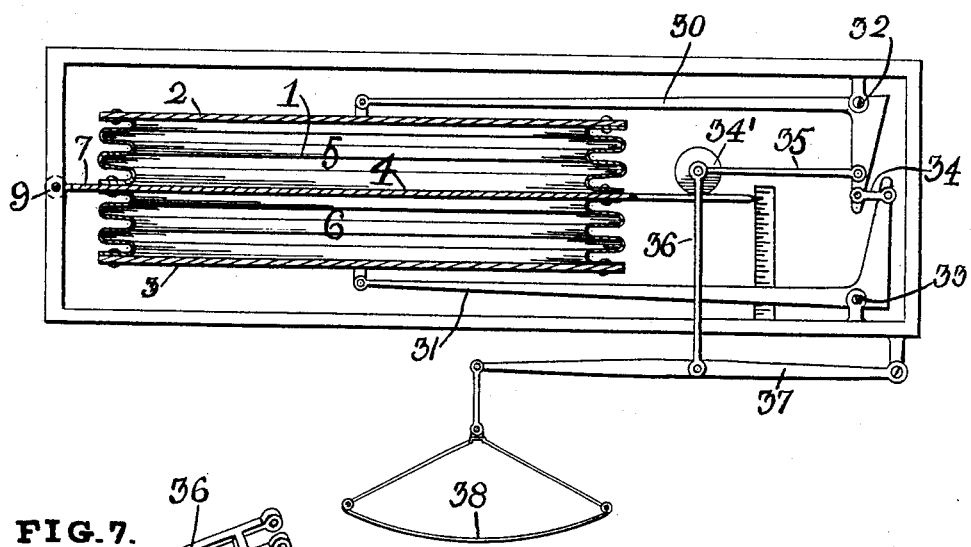
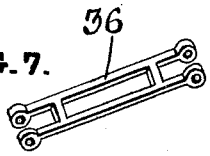
Witnesses
Chas. K. Davies.
Gustave R. Thompson.
Inventor
Weston M. Fulton,
By Mauro Cameron Lewis
Attorneys No. 772,034.

Patented October 11, 1904.

UNITED STATES PATENT OFFICE.

WESTON M. FULTON, OF KNOXVILLE, TENNESSEE.

TENSION DEVICE FOR SCALES, PRESSURE-GAGES, &c.

SPECIFICATION forming part of Letters Patent No. 772,034, dated October 11, 1904.

Application filed April 17, 1903. Serial No. 153,126. (No model.)

*To all whom it may concern:*

Be it known that I, WESTON M. FULTON, of Knoxville, Tennessee, have invented a new and useful Improvement in Tension Devices for Scales, Pressure-Gages, &c., which invention is fully set forth in the following specification.

This invention relates to springs or tension devices for use in measuring a force, as in scales, pressure-gages, &c.

Heretofore metal springs have been employed in determining weights, pressures, &c., which springs undergo changes in their molecular structure as the result of repeated strains, this change being technically known as "tiring" the metal and resulting eventually in such inaccuracy as to render the device in which they are used unreliable and worthless.

One object of the present invention is to provide a tension device for use in such cases which will not become "tired" as the result of repeated use and to combine it with elements which shall enable it to be used to measure various forces, such as weights, pressures, &c.

With this object in view the invention, broadly stated, consists in confining an expansive agent, preferably in the form of a gaseous body, in a collapsible vessel and utilizing the superior and constant elastic properties of the gas or gases as the yielding medium in measuring weights, pressure, &c. It is well known that all pure gases when subjected to changes in pressure obey a fixed law in their resultant changes in volume and this regardless of the duration of the pressure or the number of times which they may have been subjected to changes in pressure. In other words, a gas never "tires," as a metal does.

The principle of the invention may be applied to a variety of structures—such as scales, pressure-gages, and analogous structures—and it is therefore apparent that the inventive idea involved may receive various mechanical expressions.

For the purpose of illustrating the invention it is here shown as applied to weighing-scales for measuring the force of gravity; but this is not to be taken as limiting the invention to this particular class of devices.

Figure 1:
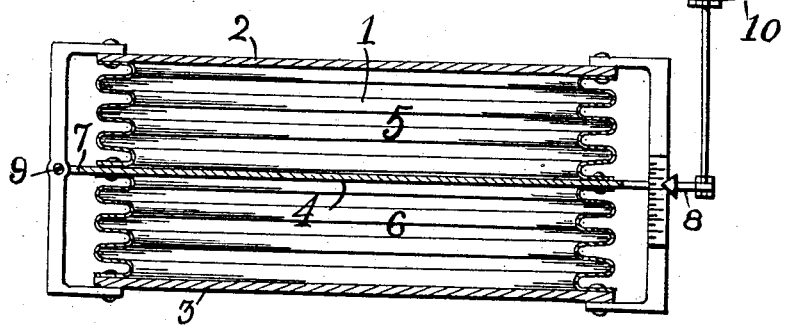
Figure 2:
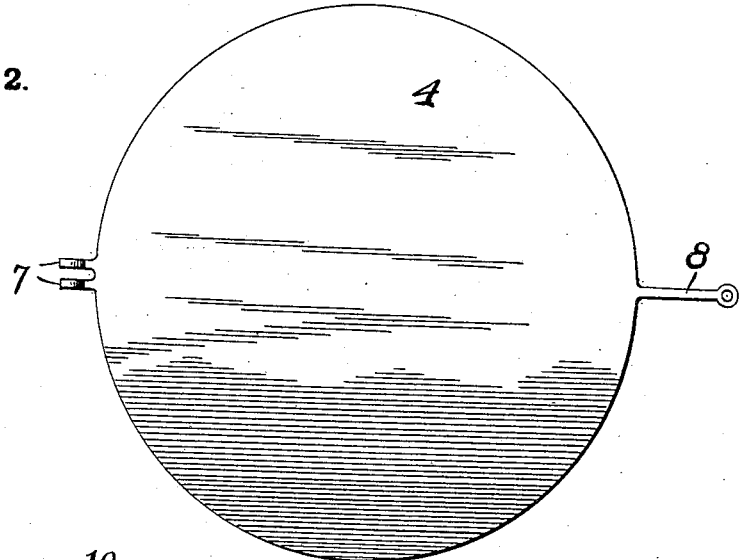
Figure 3:
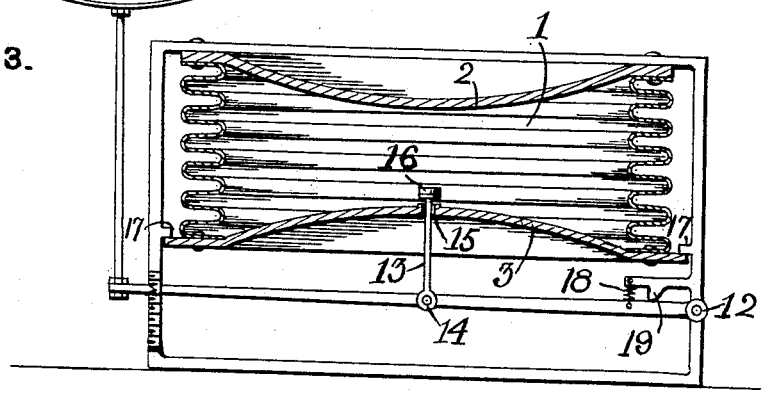

In the illustrative drawings accompanying this specification, Figure 1 is a vertical central section with parts in elevation of a weighing-scale embodying one form of the invention. Fig. 2 is a plan view of a detail. Fig. 3 is a similar view to Fig. 1 of a different form. Fig. 4 is a like view of still another form. Fig. 5 shows a broken detail of Fig. 4. Fig. 6 is a central vertical section with parts in elevation, showing an additional form of the invention; and Fig. 7 is a perspective detail of Fig. 6.

Referring to the drawings, 1 is a collapsible vessel, here shown as having flexible corrugated walls, preferably of sheet metal, and rigid end walls 2 and 3. As shown in Fig. 1, this vessel is hermetically sealed and its end walls are restrained from relative movement by securing them to a suitable framework. A rigid partition-wall 4 divides the vessel into two compartments 5 and 6, said partition 4 having hinge members 7 and an arm 8 projecting from opposite sides of the vessel 1. The collapsible vessel may be of any desired or suitable form and is here shown as a cylinder, and the partition 4 and its projecting parts 7 and 8 are formed as shown in Fig. 2. This partition is hinged at 9 to the framework, and a scale-pan 10 is mounted on the projecting arm 8. Chambers 5 and 6 are now charged with equal amounts of any suitable gas, as dry air, through any suitable opening (not shown) and then hermetically sealed. Changes in atmospheric temperature or pressure will not change the position of the partition 4 under these conditions, for the tension of the gases on opposite sides of the partition exactly balance, no matter what the temperature may be, and the rigid end walls are restrained from movement in the direction of the axis of the vessel, and the corrugated walls are rigid enough to resist atmospheric pressure. Under these conditions if any force be exerted against the arm 8 of partition 4, as by a weight placed in scale-pan 10, equilibrium will be destroyed and partition 4 moved downward. By means of any suitable scale and index the amount of pressure thus exerted may be readily indicated.

Since for any particular volume the pressure of a gas is proportional to its absolute temperature, the pressures of the gas on opposite sides of the partition 4 will neutralize each other at all temperatures in the particular position shown in Fig. 1; but the pressures on opposite sides of the partition in other positions of the partition will vary slightly with variations of temperature, and hence the device, as shown in Fig. 1, is subject to some slight error due to changes in atmospheric temperature; but its simplicity of construction renders it useful in cheap scales where a high degree of accuracy is not required or in pressure-gages where it is convenient to apply a correction for temperature.

Some of the defects of the construction of Fig. 1 may be obviated by the use of that shown in Fig. 3. In this form of the device the collapsible vessel is without the partition and only one of its walls, as the top wall 2, is secured in immovable position, the wall 3 being free to move up and down to a limited extent. The scale-pan 10 is mounted on a lever 11, fulcrumed to the framework at 12, said lever having a link 13 pivotally connected thereto at 14, this link passing through an axial port or opening 15 in the lower wall 3 of the collapsible vessel and carrying a valve 16, adapted to seat upon and close the port-opening 15. Stops 17 17 limit the collapsing movement of the wall 3, and a spring 18 reacts between the framework and the lever 11 with just sufficient power to balance the lever 11 and its connected parts and hold the lever lightly against stop 19. The port 15 and link 13 are of such relative diameters that air can freely enter the vessel around the link when the valve 16 is open.

When any object to be weighed is placed in the scale-pan, the descent of the lever 11 causes the valve 16 to close port 15, thereby entrapping air in the vessel 1, and the further downward movement of lever 11 takes place against the elasticity of the air. This combination is free from the effect of changes in atmospheric temperature; but its accuracy is affected by changes in atmospheric pressure, for since changes in atmospheric temperature take place at a relatively slow rate the amount of change during any one weighing would be inappreciable. Between each weighing valve 21 is opened and the pressure of the air in vessel 15 is allowed to readjust itself with the pressure of the atmosphere on the outside. When atmospheric pressure changes, however, the density of the entire atmosphere changes, and hence its elastic properties change. Since these changes never amount to more than a very small fraction of total atmospheric pressure, the error due to such changes is slight. The spring here consists of a gas at constant volume, but with slightly-varying pressure, whereas the ideal condition is to have a gas at constant volume and constant pressure. This ideal condition or rather its equivalent is attained by the device shown in Fig. 4, where the spring consists of a gas under both varying pressure and volume; but these changes automatically compensate for themselves by shifting the leverage of the balance-arm. The collapsible vessel 1 is mounted in a rigid frame, as in Fig. 3, and is filled with air or any other suitable gas and hermetically sealed, so as to confine the gas therein. A lever 20 is fulcrumed to the framework at 21 and is supported by a spring 18 against a stop 19, as in Fig. 3. A rabbet is formed on the end of lever 20 and a second lever 22 is pivoted to the end of lever 20, the rabbet on lever 20 forming a shoulder 23 and the end of lever 22 forming another shoulder 24, said shoulders being so spaced as to permit a bar 25 to lie between them. This bar 25 is secured to the wall 3, preferably at its center, and extends down below the lever 20. Any downward movement of lever 22 around its pivot pinches the bar 25 between shoulders 23 and 24. The lever 22 is normally supported by a spring 26, (which is weaker than spring 18,) so that the bar 25 is free to move up and down without being caught between shoulders 23 and 24. A lever 27 is fulcrumed on the lower end of bar 25 and at its other end carries a roller 29, bearing on the lever 22, the scale-pan 28 being suspended to the outer end of lever 27.

When the scales are not in use, springs 18 and 26 hold levers 20 and 22 in the positions shown in the drawings, so that bar 25 can play freely through the joint between the levers, spring 18 being adjusted to a higher tension than spring 26. Now let any object to be weighed be placed in pan 28. Then spring 26 being at lower tension than spring 18 lever 27 will be pulled down until it grips bar 25, and further downward movement of levers 20 and 22 will then take place against the elasticity of the gas in collapsible vessel 35, the two levers moving as one. When the weight is removed from pan 28, the levers will return to the positions shown in the drawings, thereby releasing bar 25. Now suppose the temperature of the atmosphere to change—e. g., fall. The gas in vessel 1 will contract, causing wall 3 to move toward wall 2 and drawing bar 25 upward. Lever 27 will push wheel 29 to the left, as seen in the drawings, thereby increasing its distance from bar 25 and giving more leverage to any weight which may be placed in pan 28. Likewise if the temperature rises wheel 29 will be drawn in toward bar 25, thereby decreasing the leverage. Changes in atmospheric pressure will cause similar action. By properly adjusting the parts this shifting of leverage may be made to exactly offset the changes in density of the gas in vessel 1 produced by atmospheric changes.

Fig. 6 shows a construction involving the same principle as Fig. 4, but it is entirely independent of metal springs and is capable of adjustment to a very high degree of accuracy. The collapsible vessel 1 with the partition 4 dividing said vessel into the two chambers 5 and 6, as in Fig. 1, is employed. Bell-crank levers 30 31 are fulcrumed to the framework at 32 and 33 and have their respective long arms pivotally connected to the respective end walls 2 and 3, while their short arms are connected to each other by the link 34. It is essential that the effective lengths of the long arms of the two levers 30 31 should be equal, and the same is true of the short arms. A roller 34' bears on arm 8 of the partition 4, and this roller is connected by a link 35 to the short arms of levers 30 31, while a forked lever 36, preferably constructed as shown in Fig. 7, depends from the roller 34' and is connected to a lever 37, fulcrumed at one end to the framework and supporting the scale-pan 38 at the other end. Chambers 5 and 6 are filled with any suitable gas, preferably dry air, exactly the same quantity of air being placed in each. They are then hermetically sealed, so as to confine the air therein. To show how this combination adjusts itself automatically, suppose any change in atmospheric conditions to occur which will cause the air in chambers 5 and 6 to contract in volume. Then since each chamber contains the same quantity of air the amount of contraction will be the same in each vessel, and since the lengths of the respective long and short arms of levers 30 and 31 are equal walls 2 and 3 will each approach partition 4 by exactly the same amount and roller 34' will be drawn somewhat to the right, as seen in the drawings, thereby increasing its distance from the common axis of the vessel 1 and giving greater leverage to any object placed in pan 38, whereby said object may be enabled to produce as much effect upon the contracted volume of air in vessel 1 as it would have produced before the air contracted in volume. Likewise if the air in the vessel expands walls 2 and 3 are driven away from partition 4 and roller 34' is pushed in toward the common axis of vessel 1, thereby decreasing the leverage. If an object to be weighed be placed in pan 38, the partition 4 will move downward. By properly adjusting the parts this combination will attain a high degree of accuracy. Other methods for accomplishing the same result might be described; but it is thought the foregoing will be sufficient to indicate how by confining a gas in a collapsible vessel I am enabled to produce a spring of superior quality. It is true that the corrugated walls of the collapsible vessel will act as a spring to resist any force tending to collapse or expand the vessel; but it will be apparent from the following example that any slight change in the elastic properties of the wall of the vessel is negligible. A cylindrical vessel one inch in altitude and six inches in diameter filled with air at ordinary atmospheric pressure will require four hundred and twenty pounds pressure to collapse it one-half inch. Of this pressure about one pound will be expended in overcoming the resistance of the corrugated wall of the vessel, while four hundred and nineteen pounds will be expended in overcoming the elasticity of the air. This can be readily taken into account in constructing the indicator to indicate the weight in the scale-pan.

While for the purposes of this description the collapsible vessel is shown as one having corrugated walls, it is not to be understood that the invention is limited to this form of collapsible vessel, as other forms may be employed without departing from the principle of the invention, and while in Figs. 3 and 6 the structure 1 is called a vessel divided into two chambers by partition 4 it is evident that it may be regarded as two vessels having a common dividing-wall 4.

What is claimed is—

1. In a means for measuring force, the combination of a collapsible vessel containing a gas, means compensating for the effects of atmospheric variations upon said vessel, means applying the force to be measured to a movable wall of said vessel, and means indicating the extent of the movement of the wall.

2. In a means for measuring force, the combination of a collapsible vessel containing a gas and having a movable wall, a lever through which the force to be measured is applied to said movable wall, means varying the leverage in proportion to atmospheric variations, and means indicating the amount of movement of the wall.

3. In a means for measuring force, the combination of a collapsible vessel containing a gas, a movable partition-wall in said vessel, means applying the force to be measured to said partition-wall to move it, and means indicating the amount of movement of said partition-wall.

4. In a means for measuring force, the combination of a collapsible vessel containing an expansive agent, means compensating for the effects of atmospheric variations upon said vessel, means applying the force to be measured to a movable part of said vessel, and means indicating the extent of movement of said part.

5. In a means for measuring force, the combination of a collapsible vessel containing an expansive agent, a lever through which the force to be measured is applied to a movable part of said vessel, means varying the leverage in proportion to atmospheric variations, and means indicating the amount of movement of said movable part.

6. In a means for measuring force, the combination of a collapsible vessel containing an expansive agent, a movable partition-wall in said vessel, means applying the force to be measured to said partition-wall to move it, and means indicating the extent of movement of said partition-wall.

7. In a means for measuring force, the combination of a collapsible vessel having rigid end walls and containing an expansive agent, a pivoted partition-wall in said vessel, means applying the power to be measured to said wall exterior to said vessel, and means indicating the extent of movement of said wall.

8. In a means for measuring force, the combination of a collapsible vessel having rigid end walls and containing an expansive agent, a pivoted partition-wall dividing said vessel into two equal chambers, means applying the force to be measured to said partition-wall at a point opposite its pivot, and means shifting said point in response to atmospheric variations.

9. In a measuring instrument, the combination of a plurality of collapsible chambers each containing a fluid, a partition-wall oppositely acted upon by the fluid in the chambers and an adjustable leverage device connected to the partition-wall.

10. In a measuring instrument, the combination of a plurality of collapsible chambers each containing a fluid, and a partition-wall oppositely acted upon by the fluid in said chambers pivoted at one side and having a projection upon the other.

11. In a means for measuring force, the combination of a collapsible vessel having rigid end walls one of which is movable and containing a fluid, a lever through which the force to be measured is applied, a link for connecting said lever to a movable wall of said vessel, and means indicating the amount of movement of said wall.

In testimony whereof I have signed this specification in the presence of two subscribing witnesses.

WESTON M. FULTON.

Witnesses:
HUGH M. TATE,
R. M. WILLIAMSON.